Oct. 14, 1969  J. L. MAXWELL  3,472,065
ADJUSTABLE TRANSDUCER MOUNTING
Filed Aug. 15, 1967
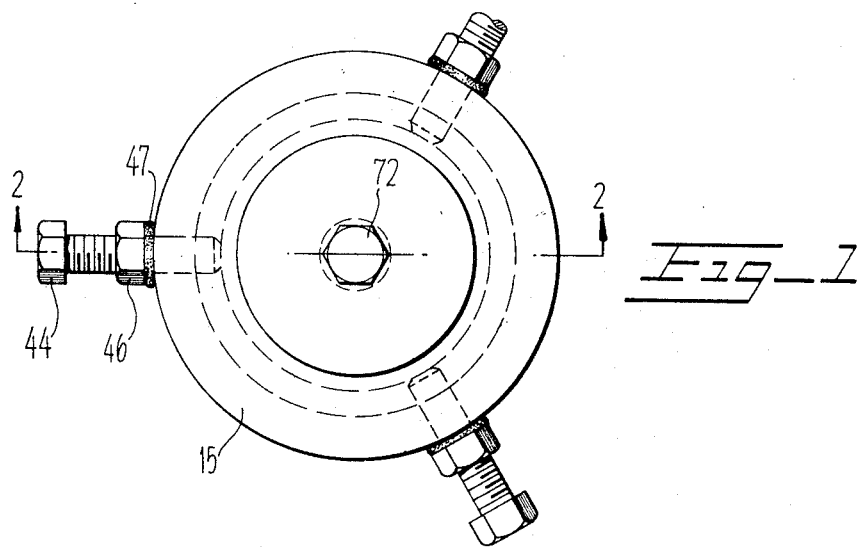
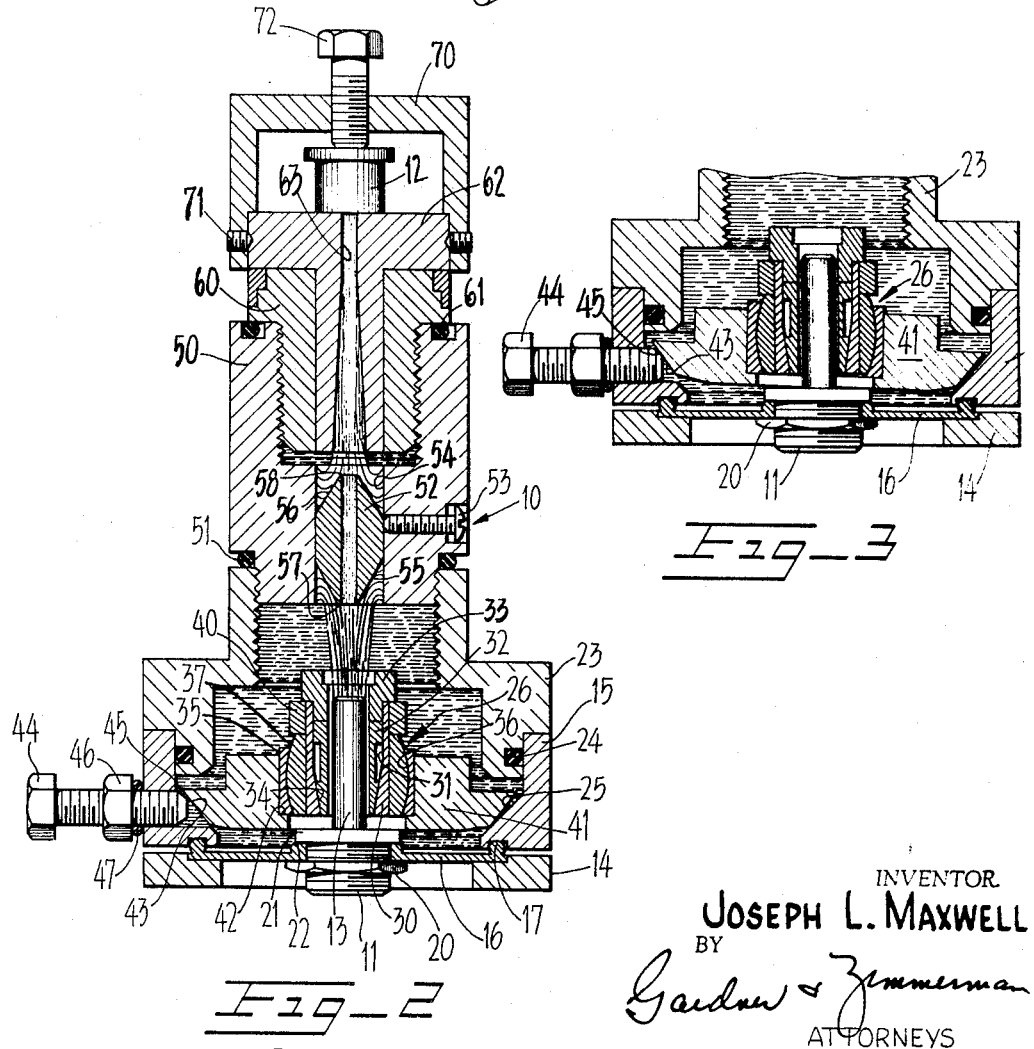
INVENTOR.
JOSEPH L. MAXWELL
BY
Gardner & Zimmerman
ATTORNEYS United States Patent Office 3,472,065
Patented Oct. 14, 1969

3,472,065
ADJUSTABLE TRANSDUCER MOUNTING
Joseph L. Maxwell, 368 Vista St.,
Livermore, Calif. 94550
Filed Aug. 15, 1967, Ser. No. 660,664
Int. Cl. G01n 9/24
U.S. Cl. 73—67.8    5 Claims

ABSTRACT OF THE DISCLOSURE

An adjustable mount for sonic transducer is described wherein the pressure waves from the transducer are collimated and used to measure the compressional sound velocity of a test specimen. The transducer is mounted in a water-filled housing having means for collimating the compressional waves. The housing also contains adjustment means for adjusting the parallelism to obtain the most efficient collimation of the compressional waves.

BACKGROUND OF THE INVENTION

The present inevntion relates to a means for mounting an ultrasonic transducer used for determining the velocity of sound in a test specimen. This type of testing apparatus is normally used to measure the ultrasonic transit time through various test specimens to determine the density of the test specimen for various purposes. For example, it can be used for flaw detection of materials, as for example, ball bearings and the like. Similarly, the equipment is used for determining the velocity of ultrasonic waves in single crystals to determine the elastic constants of single crystals.

In the past such transducer mountings have consisted of a mounting for the transducer with the leads brought out attached to a source of ultra-high frequencies. A piezoelectric crystal is used as the transducer and coupled to the specimen by various means, as for example, physical contact. The use of a physical contact between the piezoelectric crystal and the test specimen has several disadvantages. For example, the coupling has a finite sound transit time and results in an effect known as the "near" zone that causes distortion of the reflected energy. This results in a non-exponential decay of the sound echoes and makes the determination of the transit time difficult. Also, there is a limit to the size of the specimen that can be tested, the limit being imposed by the decay time of the pulse that energizes the piezoelectric crystal. The crystal is energiped with an electric pulse; however, the crystal is also connected to an amplifier having an extremely high gain. The use of a high-gain amplifier is required to amplify the returning echoes that are relatively small. Thus, the amplifier is overloaded when the crystal is pulsed and requires a finite time to recover before the crystal can receive the returning echo signal. The required recovery time is long enough to mask out echoes returning from very small specimens.

In addition to the above problems, transducers of the piezoelectric type must be exactly parallel to the specimen being examined to obtain maximum results. During manufacture it is not economically feasible to mount the piezoelectric crystal absolutely perpendicular to the axis of the holder. Thus, the mechanical and electrical axis of the transducer crystal do not coincide and the mounting of the crystal holder in the desired position will not insure the proper mounting of the crystal.

Further, commercial transducers have the problem of beam spread and edge effect causing a large loss of energy and relatively poor efficiency of the transducer. In addition to the loss of energy, the scattered energy can be reflected by any boundary media, thus causing spurious echoes that make detection of the true echo signal difficult, if not impossible.

SUMMARY OF THE INVENTION

The present invention solves the above problems by providing a transducer mounting for a piezoelectric crystal in which provision is made for adjusting the axis of the transducer so that the face of the crystal is substantially parallel to the test specimen. The mounting means also includes means for collimating the beam of the transducer to more effectively focus the beam energy onto the test specimen. Further, the collimating means include means for directing scattered radiation away from the transducer so that it does not cause spurious echoes that would tend to mask the true echo signal.

In order to effectively couple the transducer to the test specimen, the complete mounting is made fluidtight and the mounting filled with a liquid, preferably water. Water, being a very homogeneous substance and having good sound transmisison properties, will effectively couple the energy of the piezoelectric crystal to the test specimen. The use of water coupling has the additional advantage of providing an ultrasonic delay line that will delay the returning echo signal until the amplifier has recovered and is in a state for receiving the returning echo signal.

BRIEF DESCRIPTION OF THE INVENTION

The above advantages of this invention will be more easily understood from the following detailed description of a preferred embodiment when taken in conjunction with the attached drawings in which:

FIGURE 1 is a bottom view of a transducer mounting constructed according to this invention;

FIGURE 2 is a vertical section of the transducer mounting shown in FIGURE 1 and taken along line 2—2 of FIGURE 1; and FIGURE 3 is a partial vertical section showing the adjusting means in a second position.

DESCRIPTION OF A PREFERRED EMBODIMENT

Referring now to the drawings, there is shown a transducer mounting 10 having a general cylindrical shape with the transducer 11 being mounted at the bottom and the test specimen 12 being mounted at the top. As explained, the transducer is preferably a piezoelectric crystal capable of generating ultrasonic vibrations when pulsed with an ultrahigh frequency pulse. The leads from the transducer and the ultrahigh frequency pulse source are not shown in the enclosed figures. Further, the amplifier and detecting circuits required for detecting the returning echo and determining the ultrasonic transit time of the test specimen are not shown. The transducer is mounted so that the upper portion 13 of its mount projects upwardly into the interior of the mounting means. Further, the active portion is clamped to the adjusting means as more fully explained below.

The bottom portion of the transducer mounting is closed by means of a flexible diaphragm 16 whose outer edge is securely clamped between a clamping ring 14 that is secured to a supporting member 15 by suitable means, as for example, a plurality of small cap screws that pass through the ring 14 and thread into the support member 15. To effect a fluidtight seal between the flexible diaphragm 16 and the support member, an O-ring may be used. The flexible diaphragm 16 may be formed of any suitable flexible material, as for example, thin metal or the like.

The transducer is secured to the flexible diaphragm by means of a nut 20 that threads over the lower end of the transducer and seals the flange 21 to an O-ring 22 disposed between the lower surface of the flange and the flexible diaphragm. The support member 15 is joined to a clamp-support holder 23 by suitable means, as for example, a plurality of cap screws that pass through the clamp support and thread into the support member. An O-ring 24 is disposed in a circumferential groove formed in the clamp support and forms a fluidtight seal between the two members.

The upper end 13 of the transducer is securely clamped in a transducer clamping subassembly by means of a clamp sleeve 32. The sleeve is provided with a plurality of axial slots at its lower end and a conical outer surface 34 that engages a similar conical surface 31 formed on the inner surface of a sleeve 30. A locking nut 33 threads over the upper end of the sleeve 30 and engages the upper surface of the sleeve 32 to force it downwardly. As the clamp sleeve 32 moves downwardly, its conical surface 34 engages the conical surface 31, thus forcing the slotted end of the sleeve inwardly and securely clamping the upper end of the transducer. The sleeve 30 is mounted in a sleeve member 37 having a spherical outer surface 35 with the sleeve 35 being provided with a nut 40 at its upper end. The inner sleeve 30 and outer sleeve 35 and nut 40 may all be assembled as a unitary structure by braising the three elements together. The nut 40 provides a means by which the inner sleeve 30 may be held while the nut 33 is rotated to securely lock the upper portion of the transducer to the clamp subassembly as explained above.

The transducer clamping subassembly is mounted in a collar 36 having a spherical inner surface or wall 36. The collar 35 may be formed in a plurality of pieces which may be placed around the transducer clamping subassembly and then the completed unit lowered into the circular recess formed in the transducer clamp adjusting base 41. The lower surface of the collar 35 rests on an inwardly projecting shoulder 42 formed on the circular recess of the adjusting base. The adjusting base is provided with a conical or sloping outer surface 43 while a similar surface 25 is formed on the inner surface of the support member 15. The two surfaces do not have the same slope angle, since the surface on the support member merely serves to provide a preliminary position for the adjusting base.

Three adjusting screws 44 are provided for controlling the tilt of the adjusting base 41. The screws 44 thread through suitable radial openings in the support base 15 and are provided with conical ends 45. The conical ends 45 engage the conical surface 43 on the adjusting base, as is best shown in FIGURE 3. A locking nut 46 and O-ring 47 are provided for locking and sealing the adjusting screws in position, as described below.

A bushing holder 50 is attached to the upper end of the clamp support holder 23 by suitable means, as for example, threading the bushing holder into the clamping holder. An O-ring 51 is provided between the opposing shoulders o nthe two members to provide an effective seal. A collimating bushing 52 is positioned in a central opening 54 in the bushing holder 50. The collimating bushing 52 may be held in place by means of a small set screw 53 that threads through an opening in the bushing holder 50 and engages the outer surface of the collimating bushing.

The collimating bushing 52 is provided with a sloping outer surface 55 at its lower end and a similar surface 56 at its upper end. The sloping or conical outer surfaces terminate in very sharp edges 57 and 58 at the bottom and top of the bushing, respectively. The edges should be relatively sharp to provide an effective separation between the collimated beam of the transducer and scattered and diffracted radiation which passes outwardly along the conical surfaces.

A plug holder 60 is secured to the bushing holder 50 by suitable means, as for example, threading the plug holder into the bushing holder and providing an O-ring 61 for effecting a seal between the surfaces. A post collimating plug 62 is inserted in the center of the plug holder 60 and serves to effect a post collimation of the radiation beam transmitted through the collimating bushing 52. This collimating plug is provided with a slight tapering surface 63 that terminates in an opening over which the test specimen 12 is mounted. The test specimen 12 is clamped in position by means of a U-shaped clamping member 70 whose legs are secured to the collimating plug 62 by means of small set screws 71. A clamping screw 72 is provided in the top of the U-shaped clamp for securely clamping the test specimen to the top surface of the collimating plug 62.

The various portions of the transducer mount may be formed of suitable materials, for example, metal or plastic. It is preferable to form the transducer clamping subassembly, adjusting base, and supporting member 15 of metal to eliminate wear in these parts. The remainder of the mounting may be formed of plastic materials, if desired.

OPERATION

The transducer mounting means of this invention is operated by first assemblying the various parts of the transducer mounting assembly 10. After the parts are assembled, the transducer is clamped to the subassembly clamping means secured to the upper portion 13 of the transducer, and this portion is then inserted in the adjusting base and secured to the flexible diaphragm. The flexible diaphragm can then be secured to the bottom of the transducer mounting means. The complete mounting means is then filled with water and the flexible diaphragm 16 pretensioned. The pretension can be applied to the flexible diaphragm by running the three adjusting screws in to axially move the adjusting base in an upward direction. The diaphragm should be tensioned so that it assumes a concave shape.

After the flexible diaphragm is pretensioned the transducer can be energized and the returning echoes observed on an oscilloscope or other monitoring device. The axis of the transducer can then be adjusted until its active surface is substantially parallel with the surface of the test specimen 12. This adjustment of the axis of the transducer can be effected by adjusting two of the adjusting screws while retaining the third in a fixed position. This will effectively tilt the adjusting base relative to the pivot point formed by the third adjusting screw. As the base tilts, the upper edge of the spherical surface of the outer sleeve 35 will tend to force the transducer subassembly clamp in a direction towards the fixed adjusting screw. The transducer will be rotated about a pivot point that lies at the intersection of its axis and the flexible diaphragm 16. The adjustment can be continued until the signal observed on the oscilloscope reaches a maximum amplitude.

From the above description, it can be seen that the transducer mounting means of this invention provides a means by which the active surface of the transducer may be aligned parallel with the surface of the test specimen. This adjustment is provided by securely clamping the transducer element in a subassembly and then pivoting the subassembly about a point to effectively move the axis of the transducer. This permits an easy alignment of the active surface of the transducer with the surface of the test specimen.

Further, the transducer assembly is made liquidtight in order that a suitable liquid, preferably water, may be used for coupling the transducer to the test specimen. The water also provides an effective acoustic delay line that eliminates the problem of echoes returning before the overloaded amplifier has returned to its normal condition. The mounting means is also provided with a collimating means that effectively collimates the radiation beam of the transducer, while directing the scattered and defracted radiation away from the transducer. This deflection is effected by the conical surfaces 55 and 56 of the collimating bushing 52. Thus, the scattered radiation is deflected away when the transducer is pulsed to transmit a beam of radiation to the test specimen and likewise directed away when the returning echo from the specimen travels back to the transducer. The elimination of the scattered radiation from the returning echo greatly improves the quality of the echo signal and simplifies the detection of the returning echo and the subsequent measurement of the ultrasonic transit time of the test specimen.

What is claimed is:

1. A mounting for a sonic transducer used for measuring the compressional velocity of a test specimen, said mounting comprising:

an elongated housing having at one end clamping means for retaining a test specimen in position; a flexible diaphragm secured to and closing the other end of said housing; a sonic transducer coupled to said flexible diaphragm and projecting into said housing; a transducer clamping assembly secured to the portion of said transducer projecting into said housing; collimating means mounted in said housing substantially coaxial with the axis of said transducer; and adjusting means projecting through the wall of the housing and operably engaging said clamping assembly whereby the axis of said transducer may be adjusted to position the active surface of the transducer parallel to the test specimen.

2. The mountiing means of claim 1 wherein said transducer clamping means comprises a center portion having means for engaging said transducer and an outwardly projecting adjusting base; said adjusting means comprises at least one adjustable-length member projecting through the housing and engaging said adjusting base whereby said adjusting base may be tilted to tilt the axis of said transducer.

3. The mounting means of claim 1 wherein said collimating means comprises a bushing having a central bore and conical outer surfaces adjacent each end, said conical outer surfaces terminating at a sharp edge where they intersect the central bore.

4. The mounting means of claim 1 wherein said housing is fluid tight.

5. The mounting means of claim 2 wherein said adjusting base is provided with a conical outer surface and said adjustable-length member comprises three adjusting bolts threadably received through the wall of said housing, said bolts having conical ends that engage said conical outer surface on said adjusting base.

References Cited

FOREIGN PATENTS 1,285,993   1/1962   France.

OTHER REFERENCES

Moskimin et al., Measurement of Very Small Changes in the Velocity of Ultrasonic Waves in Solids, The Journal of the Acoustical Society of America, April, 1967, p. 1052–1057. (73–67.9).

RICHARD C. QUEISSER, Primary Examiner

J. P. BEAUCHAMP, Assistant Examiner

U.S. Cl. X.R.

310—9.1